United States Patent

Kilpatrich et al.

[15] 3,703,097
[45] Nov. 21, 1972

[54] METHOD AND SYSTEM FOR MEASURING SHEET FLATNESS

[72] Inventors: Stanley A. Kilpatrich, Spokane, Wash.; Woodard A. Niethammer, Pleasanton, Calif.

[73] Assignee: Kaiser Aluminum & Chemical Corporation, Oakland, Calif.

[22] Filed: Dec. 24, 1970

[21] Appl. No.: 101,242

[52] U.S. Cl..................................73/159, 33/147 L
[51] Int. Cl...............................................G01l 33/20
[58] Field of Search......73/159; 72/11, 12; 33/147 L, 33/174 P

[56] References Cited

UNITED STATES PATENTS

| | | | |
|---|---|---|---|
| 3,499,306 | 3/1970 | Pearson | 73/159 |
| 3,256,610 | 6/1966 | Brys | 33/147 L |
| 3,585,495 | 6/1971 | Kubo et al. | 33/147 L |

*Primary Examiner*—Louis J. Capozi
*Assistant Examiner*—Denis E. Corr
*Attorney*—Paul E. Calrow, Harold L. Jenkins and Edward J. Lynch

[57] ABSTRACT

A process for measuring sheet flatness comprising placing the sheet under sufficient longitudinal tension to remove substantially all internal compressive strains in the longitudinal direction and measuring the transverse profile of the sheet surface by suitable noncontacting proximity sensors and a system for such measurement.

24 Claims, 14 Drawing Figures

PATENTED NOV 21 1972 3,703,097

FIG_1A

FIG_1B

FIG_1C

FIG_1D

STANLEY A. KILPATRICK
WOODARD A. NIETHAMMER
INVENTORS

BY Edward J Lynch

ATTORNEY

FIG_4

FIG_5

STANLEY A. KILPATRICK &
WOODARD A. NIETHAMMER
INVENTORS

BY Edward J Lynch

ATTORNEY

FIG_6

FIG_7A

SHEET CROSS CURVATURE MEASUREMENT, SURFACE 1-UP

CALCULATED DEVIATION IN AVERAGE CROSS CURVATURE
FROM SURFACE 1-UP ∽ SURFACE 1-UP MINUS AVERAGE CURVATURE

FIG_7D

AVERAGE LONGITUDINAL STRAIN DISTRIBUTION ACROSS
SHEET WIDTH AT VARIOUS STRESS LEVELS
AVERAGE OF SURFACE 1-UP & SURFACE 2-UP

FIG_8

METHOD AND SYSTEM FOR MEASURING SHEET FLATNESS

BACKGROUND OF THE INVENTION

During the rolling of metallic sheet material, the differential pressures across the width of the sheet causes differential longitudinal strains to exist in the sheet after rolling. These differential pressures can be caused by among other things thermal differences across the roll width, frictional differences, roll bending, roll grind, interstrand tension effects, and the like. If these internal residual strains are of sufficient magnitude, i.e., greater than the critical buckling stress, the resultant sheet product will exhibit an unflatness or distortion when placed on a flat surface. These distortions, herein termed "rolled-in unflatness" or "rolled-in differential strain" in their most simple form are exhibited by a center buckle or edge waviness depending on the placement of the longitudinal tensile and compressive strains. The center buckle distortion is usually caused by the center portion of the sheet being reduced more, thus extended longer, than the edge portion resulting in compressive strains in the center portion of the sheet. On the other hand, the edge waviness is caused by the edge of the sheet being reduced more than the center portion resulting in compressive strains in the edge portion of the sheet. Sheet unflatness is undesirable from an appearance standpoint; and also because of difficulties experienced in subsequent manufacturing processes. A considerable portion of the sheet materials manufactured today are rejected because of unflatness.

During the rolling of the sheet, if is under tension at high process speeds and visual inspection of the sheet to determine unflatness is usually difficult, if not impossible, even for the most experienced operators. Similar difficulties are experienced on leveler lines and the like. Qualitative and quantitative measurements are generally done after the fact by the simple process of placing a sheet sample on a flat surface or table.

Several systems and methods for measuring sheet flatness during strip rolling or other process operations have been developed, but none have been fully successful or acceptable. Possibly, the most frequently mentioned process for measuring sheet flatness comprises placing tension sensing devices across the sheet transverse to the rolling direction while the sheet or strip is under longitudinal tension to measure the differential tension across the width of the sheet. Such systems and processes are described in U.S. Pat. Nos. 3,315,506; 3,442,104; 3,475,935, and 3,334,588. However, these contacting measuring systems can cause surface defects, such as scratching or the like, and they present a continual calibration problem. U.S. Pat. No. 3,315,506 also discloses noncontacting magnetic tension measuring means to determine the differential tension across the width of the sheet, but this method is more or less limited to ferrous materials.

Other systems and processes have been developed, such as are disclosed in U.S. Pat. Nos. 3,415,340; 3,433,058; 3,459,019 and 3,470,739, wherein the flatness or unflatness of the sheet in a relatively untensioned condition is measured by both contacting and noncontacting sensing means. However, these processes require the strip speed be reduced considerably in order that a tension-free zone can be maintained and thus these systems are not applicable to the normal high-speed rolling and leveling operations.

In prior art processes and systems described above accurate quantitative data is difficult if not impossible to obtain. Moreover, these processes and systems are limited to determining rolled-in unflatness only. If other types of unflatness such as permanent bend set from transverse and longitudinal bending strains exist in the sheet material, the prior art methods cannot distinguish between rolled-in unflatness and permanent bend set unflatness. This latter point is of primary importance because permanent bend set unflatness interferes with the rolled-in unflatness determination and can give erroneous results.

BRIEF DESCRIPTION OF DRAWINGS

FIG. 7D is the deviation of the average shown in FIG. 7C from the surface profile shown in FIG. 7A.

DESCRIPTION OF THE INVENTION

Figure 1A:
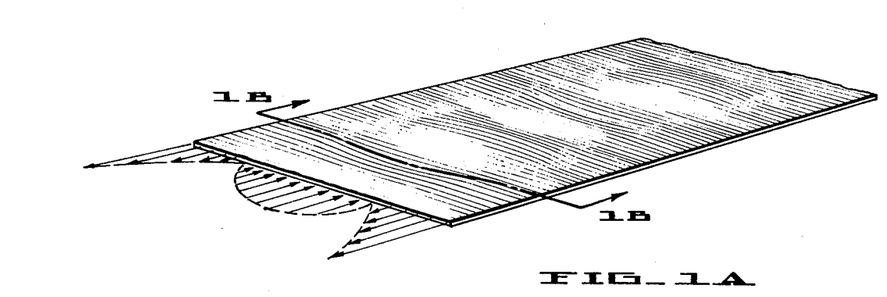
FIGS. 1A and 1C are exaggerated schematic views of unflat sheet indicating the various internal rolled-in strains therein.
Figure 1B:
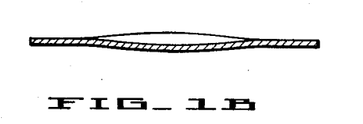
FIGS. 1B and 1D are cross-sectional views A—A of FIGS. 1A and 1C respectively.
Figure 1C:
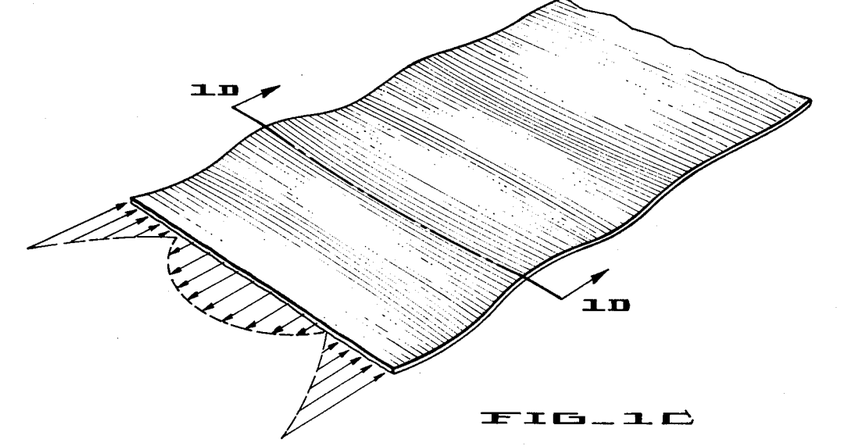
Figure 1D:
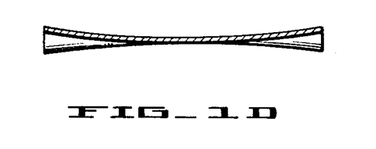

The present invention relates to an improved method and system for measuring the flatness of sheet material wherein the sheet material is placed in sufficient tension to remove substantially all internal compressive strains in the longitudinal direction and measuring the surface profile of the sheet transverse to the longitudinal direction by proximity sensing means. The inventors have found that the sheet so tensioned will assume a double curvature shape which is a function of the unflatness or internal strains of the sheet material in an untensioned condition. The shape of the profile of the sheet transverse to the rolling direction generally indicates unflatness of the sheet. This unflatness may be due to the rolled-in differential strain which has been previously discussed and which is shown in FIGS. 1A and 1C. However, other types of unflatness such as a permanent bend set from longitudinal and transverse bending strains can be developed in the rolling mill train and in leveler line systems which increase considerably the complexity of measuring unflatness.

In accordance with this invention, it has been found that sheet material will assume a double curvature shape when subjected to sufficient tension to remove substantially all compressive strains in the sheet, which is characteristic of the internal strains of the material in an untensioned condition. This phenomenon is shown somewhat exaggerated and simplified in FIG. 2 for sheet material having only rolled-in unflatness in the form of center buckle. With rolled-in edge buckles unflatness the curve of the sheet transverse to the rolling direction will be convex rather than concave as shown in the figure.

The tension which is applied to the sheet material must be sufficient to elastically remove substantially all of the compressive strains in the sheet material, i.e., remove all buckles and waves from view. However, the tensile forces should never exceed the yield strength of the material. Preferably, the tension is maintained below 50 percent of the yield strength. Accurate transverse profile measurements are increasingly difficult with increasing tension.

Accurate profile measurements in accordance with this invention provide sufficient information to determine qualitatively the type of unflatness and the relative magnitude thereof. Moreover this qualitative information is adequate for a rolling mill operator or leveler line operator to correct for unflatness during the operation of their respective machines. From the shape of the profile, e.g., whether convex or concave, the operator can determine whether center buckle or edge buckle unflatness is present and by the magnitude of the convexity or concavity of the profile, the operator can determine the relative magnitude of the unflatness. Frequently the shape of the cross profile of the sheet is more complex than the simple center buckle and edge waviness mentioned above and in this case the process of the present invention indicates to the operator where the maximum and minimum strains exist in the sheet so that he may make suitable adjustments in his machinery to minimize unflatness. Most importantly, the present invention provides a method for distinguishing the various types of unflatness. Knowing the type and relative magnitude of unflatness in the sheet, the operator, particularly lever line operators, can easily make adjustments in the equipment to minimize the unflatness because the various types of unflatness have different causes.

The present invention is based on the appreciation that unflat sheet, not constrained by outside forces, will tend to approach its lowest energy state, i.e., the internal strains which cause the unflatness will tend to relax. For example, a sheet having center buckle unflatness due to rolled-in differential strain will elongate in the center portion to relieve the compressive strains therein and will shorten along the edge portion to relieve the tensile strain therein. This relaxation of the internal strains will cause the unrestrained sheet to form a double curvature shape; that is, the sheet will have a longitudinal curvature and a transverse curvature. In analyzing the longitudinal and transverse curvatures of the relaxed sheet, it has been found that the shape or preferably the transverse profile of the sheet is a function of the internal strains before relaxation.

Because the strains in a sheet having only rolled-in unflatness are uniform throughout the thickness of the sheet, the shape of the unconstrained sheet is reversible; that is to say, the double curvature shape can be snapped through from one direction of curvature to the other with no change in the shape of the curvature. The radius of the longitudinal curvature would be the same as would the transverse bow. The whole shape would simply shift through 180°.

However, if other types of unflatness such as longitudinal and transverse bending strain exist in the sheet, the strains are not uniform throughout the thickness of the sheet which result in the shape of the sheet being different from the shape produced by only rolled-in unflatness. Moreover, the nonuniformity of the strain prevents the shape of the sheet in the unconstrained condition from being reversible; that is, either the sheet will snap through but not have the same shape or the sheet will return to the original position.

Placing a sheet in a completely unconstrained condition is from a practical standpoint extremely difficult, if not impossible. However, it has been found that by hanging the sheet by its longitudinal edge the unconstrained condition can be approached. By analyzing the shape of the edge on the sheet, the magnitude of unflatness can be determined. However, this type of measurement is limited to off-the-line or after-the-fact type of measuring.

The inventors have found that by placing the sheet in sufficient longitudinal tension to remove substantially all of the internal compressive strains, i.e., enough tension to remove the buckles, edge waviness and the like from view, the sheet will also assume a double curvature shape due to the tendency of a sheet having internal strains to approach its least energy state. The sheet of course would be constrained both by the tension imparted to the sheet and also by the gravitational forces. Nonetheless, the double curvature shape of the sheet can still be related to the internal strains in the sheet and can be analyzed to determine the amount of unflatness. To simplify the unflatness determination, it is preferred to maintain the sheet in a horizontal direction. The magnitude and direction of the longitudinal and transverse curvatures obtained by this method would not necessarily be the same as the edge-hung sheet. If only rolled-in differential strain exists in the sheet, the transverse profile of the tensioned sheet is related to the rolled-in differential strain. However, if longitudinal or transverse bending strains exist in the sheet, there is no way to distinguish and measure the various types of unflatness by the single determination of the cross profile of the sheet.

The inventors have found that by first determining the transverse profile of the tensioned sheet in a horizontal plane, inverting the sheet and again determining the transverse profile the average of the two profiles is an indication of the rolled-in unflatness, separate and distinct from the other forms of unflatness. Moreover, it has been found that the difference between one of the profiles and the average profile provides an indication of the other types of unflatness separate and distinct from the rolled-in unflatness. For convenience this difference is herein shown and described as the first transverse profile minus the average transverse profile. However, the difference could just as easily be described as the reverse of the above, the second transverse profile minus the average transverse profile or the average transverse profile minus the second transverse profile.

In this method the sheet sags from its own weight and assumes a double curvature shape. The same effect can be obtained by applying a substantially uniform force per unit area to the sheet normal to one face of the sheet, such as by air jets, measuring the cross profile, applying the same force normal to the other face of the sheet and again measuring the transverse profile. However, except for the vertical position, in this latter method the effects of gravitation must be taken into consideration in all positions, i.e., the force per unit area must be modified to offset the effect of gravity on the sheet. In all circumstances, however, the force must be sufficient to cause the sheet to curve longitudinally in the direction of the force. The span length should be the same in both instances.

Figure 2:
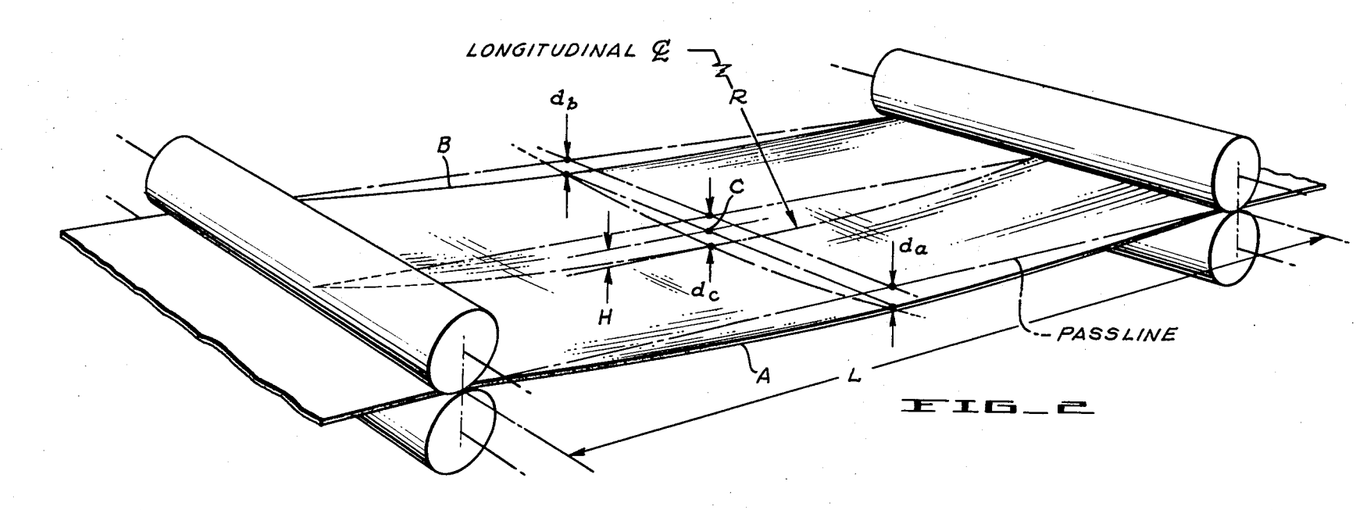
FIG. 2 is an isometric view of tensioned sheet material to illustrate the shape taken.
Figure 2D:
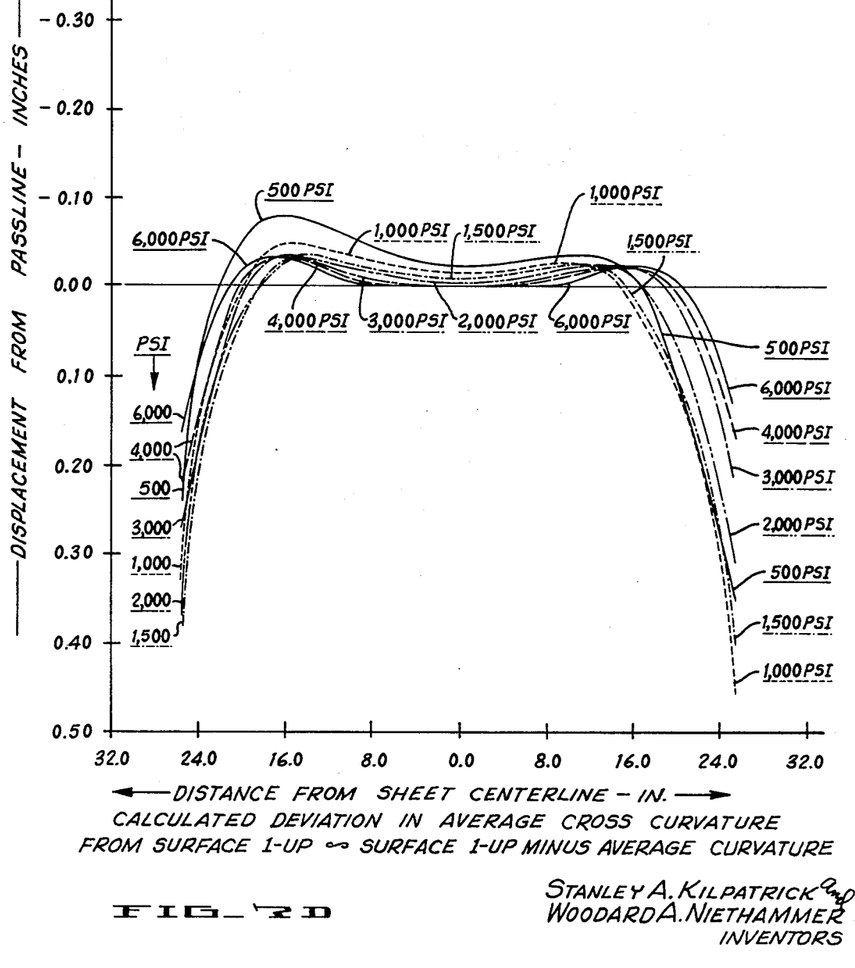

It can be shown that the longitudinal stress at a point on a strip of sheet material suspended from two supports as is shown in FIG. 2 can be found from the equation $$\sigma = (\gamma L^2/8d) \qquad (1)$$

where
$\gamma$ = density of sheet (lbs/in$^3$)
$L$ = span length between supports (in)
$d$ = displacement of sheet from pass line (in)

This equation was developed from an appreciation that the radius R in inches of the longitudinal curvature of the sheet is equal to both expressions $\sigma/\gamma$ and $L^2/8d$.

The differential longitudinal stress between any two points on the sheet can be found by the equation $$\sigma_1 - \sigma_2 = (\gamma L^2/8)[(1/d_1) - (1/d_2)] \qquad (2)$$

where $d_1$ and $d_2$ represent the displacement at points 1 and 2 respectively.

The rolled-in differential strain $\epsilon$ between two points can be found by dividing Equation 2 by the modulus of elasticity E.

$$\epsilon = (\sigma_1 - \sigma_2/E) = (\gamma L^2/8E)[(1/d_1) - (1/d_2)] \qquad (3)$$

In measuring the entire sheet width the points to determine are those where the sheet exhibits maximum and minimum strain. Generally the sheet exhibits maximum or minimum strain at or near the edges.

Because of camber, tracking deviations and the like, the displacement or sag at each edge will not be the same and it is necessary to average the stress at each edge. Thus Equation 1 becomes $$(\sigma_a + \sigma_b/2) = (1/16) \gamma L^2 [(1/d_a) + (1/d_b)] \qquad (4)$$

where $\sigma_a$ and $\sigma_b$ and $d_a$ and $d_b$ represent respectively the stress and sag at edges $a$ and $b$. But the remaining maximum or minimum strain point $c$ the strain is $$\sigma_c = (\gamma L^2/8d_c) \qquad (5)$$

Thus, the equation for maximum differential strain becomes $$\epsilon_0 = (\gamma L^2/16E)[(2/d_c) - (1/d_a) - (1/d_b)] \qquad (6)$$

Because in most instances the span length and the density are constants and because of the need usually to correlate calculated data with actual data Equation 6 can be rewritten as $$\epsilon_0 = K[(2/d_c) - (1/d_a) - (1/d_b)] \qquad (7)$$

with the constant $K$ including the density, span length, modulus of elasticity and a correction factor to correlate calculated data with measured data. Equation 3 can be similarly modified.

From theoretical and imperical considerations the following equation for determining the rolled-in differential strain has been developed which provides accurate differential strain data for simple shapes such as occurs with center buckle, edge waviness and the like.

$$\epsilon_0 = H(n-1)^{n-1}[X + (K/X^{n-1})] \qquad (8)$$

where
$x = 1/R$
$K = 60(t/W^2)(n-1)[(n-1/W^2/t)]^{n-2}$
$n = 2 + (1/400)(W^2)/(Lt)$
$H$ = transverse deflection of sheet between points of maximum and minimum strains $^{(in.)}$ In commercial practice sheet unflatness is frequently related to the ratio of wave height, $\alpha$ to the wave length, $\lambda$ of the buckle or wave of the sheet lying on a flat table. The maximum differential strain calculated from Equations 6, 7 or 8 is related to the ratio $\alpha/\lambda$ by the expression $$\epsilon_0 = 2.48 \left(\frac{a}{\lambda}\right)^2 \qquad (9)$$

Figure 4:
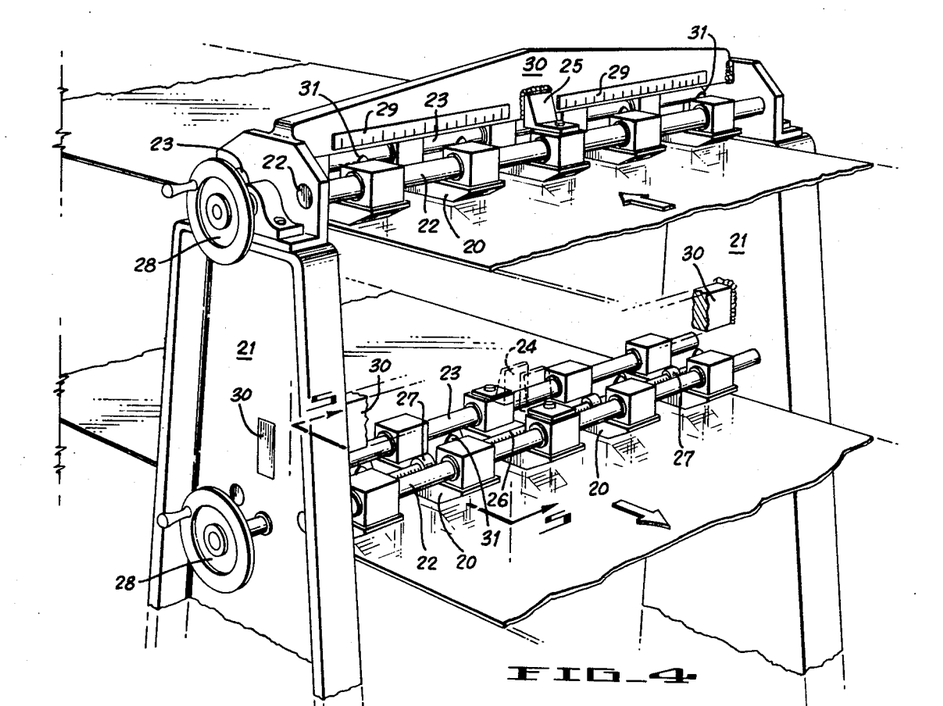
FIG. 4 is an isometric view illustrating in detail a system of the present invention with parts removed for clarity.

Generally in the process of this invention, the sheet to be measured is placed in longitudinal tension with a span length which is sufficient to minimize the effect of any bending moments at the contact points. The sheet from its own weight sags and assumes a particular double curvature shape which is characteristic of the internal strains in the sheet when untensioned. As shown in FIG. 4, noncontacting proximity sensors such as eddy current, ultrasonic, optic, capacitance, inductance, or microwave devices are spaced from this sheet in a known datum plane across the width of the sheet, transverse to the longitudinal or rolling direction. Preferably, the proximity sensors measure the distance from the pass line of the tension applying means to the sheet surface. A plurality of noncontacting devices or one device which can be moved across the width of the sheet can be employed. However, sufficient measurements of the distance from the datum plane to the sheet surface must be taken across the width of the sheet to determine with reasonable accuracy the profile the sheet has taken. At least three, preferably five or more, measurements across the width of the sheet are necessary for accurate cross profile measurements. Noncontacting proximity sensors are desired because contacting devices can change the shape of the sheet.

A signal is generated for each measuring position which is related to the distance from the datum plane to the sheet surface. If only a qualitative determination of sheet unflatness is desired, the signals may be used to reproduce the profile of the sheet on a read-out device such as oscilloscope, bargraph, or other similar display device. If quantitative unflatness measurement is desired a computing device such as an analog or digital computer may be employed to utilize the signals to determine the rolled-in differential strain from equations similar to Equations 6, 7 and 8 above. Moreover, by employing standard control techniques the differential strain which is determined above can be used to control unflatness in rolling mills, leveler lines and the like.

In sheet where only rolled-in differential strains are present, only one surface profile determination need be made. However, where rolled-in unflatness is combined with other types of sheet unflatness, a single determination from one surface may give erroneous results and both surfaces of the sheet material must be measured. In this case the average profile is determined by averaging the signals from both profile determinations in a suitable manner such as with a summing circuit with a divider to provide signals which may be used to reproduce the average profile of the sheet on a display device or be used by a computing device to determine the rolled-in differential strain across the width of the sheet from equations such as Equations 6, 7 and 8 above. The deviation of the average profile can be similarly obtained in a suitable manner such as a summing circuit with a sign inverter for display or computational purposes. Normally the same number of proximity sensors are employed for both profile determinations at the same point on both sides of the sheet to allow for the point by point averaging and subtracting. The tension applied to the sheet during both measurements should be approximately equal; otherwise the average profile would be more or less meaningless unless the signals are modified to correct for the difference in tension. To utilize the equations above to determine the differential strain, $\epsilon_0$, in this instance, the values of the sag d or deflection H must be determined from the average profile.

Although there is a wide range of different types of noncontacting proximity sensors which can be employed in the present invention, it has been found the eddy current devices are particularly useful in this application to measure the distance from a datum plane to the surface of the sheet to determine the profile of the sheet. The eddy current device is particularly useful because the device can be made to be relatively insensitive to surface conditions, composition changes, and the speed of the sheet. Moreover, such a device is quite accurate and can easily be made to produce a linear output. A particularly suitable device is Model No. 1105-10 produced by the Kaman Nuclear Corporation.

Figure 3:
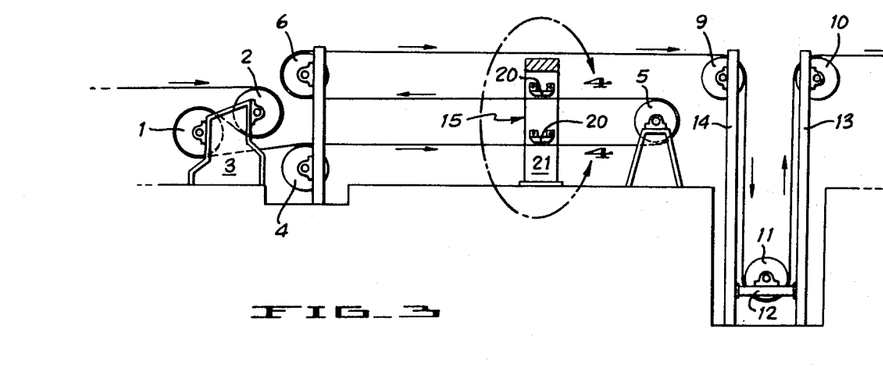
FIG. 3 is an overall side view of a system of the present invention for measuring sheet flatness.
Figure 5:
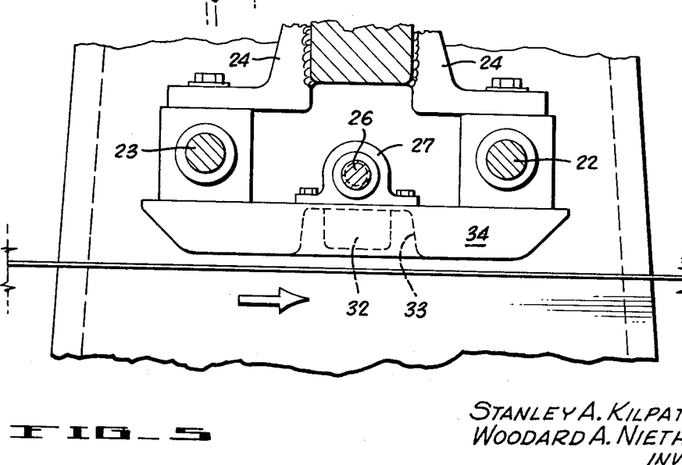
FIG. 5 is a cross-sectional view of FIG. 4 taken along line B—B.

With reference to FIGS. 3, 4 and 5, wherein like numerals are employed to designate like parts, one form of an apparatus for carrying out this invention is described. With particular reference to FIG. 3, the apparatus comprises a powered bridal roll system of rolls 1 and 2 supported by frame member 3, an arrangement of idler rolls 4, 5 and 6 suitably supported as indicated on frame members 7 and 8, a dancer roll system of fixed idler rolls 9 and 10 rigidly mounted on frame members 13 and 14 and a dancer roll 11 which is slidably mounted on said frames by cross member 12, and a profile sensing system 15 which is shown in detail in FIGS. 4 and 5. In FIG. 3 only the sensor housings 20 and support member 21 of the sensing system are shown.

In FIG. 4 both the upper and lower group of sensor housings and the mountings are identical and therefore will be discussed together. In the drawing portions are cut away for clarity. The proximity sensor housings 20 are slidably mounted on shafts 22 and 23, which are suitably supported on the frame members 21. Each group of sensors is further supported by angles 24 and 25 which are attached to cross frame member 30. A screw shaft 26, which is oppositely threaded on both halves of the shaft, is provided for moving the sensor housings on both sides of the center housing to compensate for differences in width of the sheets. Shaft 26 passes through threaded brackets 27 which are attached to the sensor housing 20. The center housing is not attached to the shaft 26 A hand crank 28 is provided for rotating the shaft 26. Sensor position indicators 29 are provided on the cross frame members 30 and pointers 31 are provided on each of the sensor housings which move. As shown in FIG. 5, the proximity sensor heads 32 are mounted within a recess 33 of the sensor housing shoe 34. The eddy current device has a small operating range about 0.10 to 3.0 inches and thus must be placed in close proximity to the surface to be measured. Usually the operating range of these devices is maintained at less than 1 inch because it becomes increasingly difficult to maintain an output linear with the distance sensed greater than one inch. Other types of sensing heads will be positioned at various distances from the sheet depending upon the range of the instrument.

Figure 6:
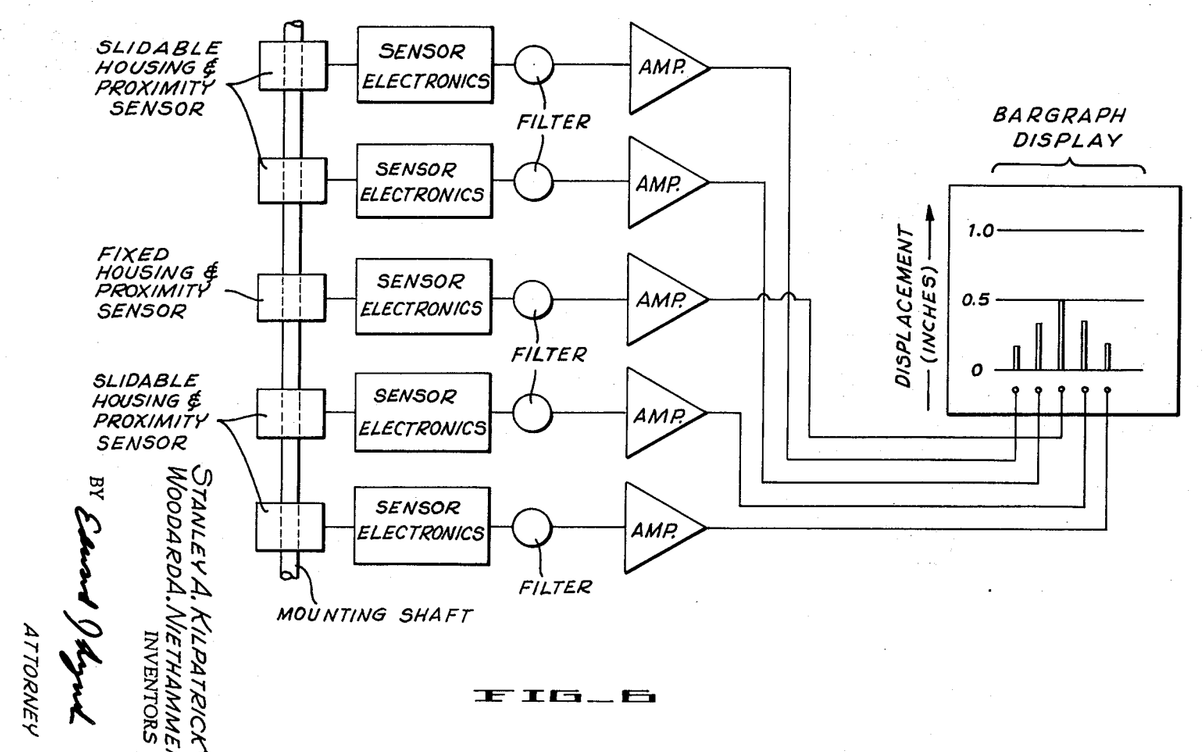
FIG. 6 is a block diagram of the electronics of the measuring system of the present invention.

FIG. 6 is a diagrammatic representation of a preferred flatness measuring system in accordance with the present invention. In the system shown eddy current proximity sensors are mounted within the sensor housings. The proximity sensor comprises a displacement transducer which contains an active and an inactive (compensating) coil in the sensor head. These coils are electrically connected to form two arms of a four-arm bridge circuit which is energized by a 1 mHz oscillator source. When the circuit is activated, a magnetic field emits flux lines into the conductive surface to be measured, producing circular and coaxial eddy currents which produce in turn a magnetic field opposed to the field originally produced by the coil. The superposition of the two fields reduces the effective inductance of the active coil and the reduced magnetic force is measured as an impedance loss within the active coil by the transducer circuit. As the distance between the sensor head and surface measured decreases, the impedance loss increases. However, the impedance losses are not linear with respect to the distance between the sensor head and the surface measured and a logarithmic compression demodulator circuit is necessary to linearize the signal from the transducer. In FIG. 6 the oscillator source and the modulator circuit are indicated as the sensor electronics. A low frequency filter is provided to filter out the low frequency variations in the sensor output caused by sheet oscillations. The signal from the filter is amplified by the amplifier and then displayed on a bargraph device shown. The Metrascope Model No. 19 manufactured by the Metra Instrument Co., of Mountain View, Cal., has been found particularly useful as a display device. An alternate display system could consist of a multiplexing unit scanning each amplifier output and transmitting the signals for continual display on the oscilloscope screen.

To allow for an easier qualitative determination of the degree of unflatness, it is preferred to replace the amplifiers with differential amplifiers referenced to the output of the center sensor. The center sensor output can be used to display the longitudinal sag of the sheet measured.

The system shown in FIG. 6 for measuring sheet flatness is designed to measure only one surface. However, if it is necessary to differentiate between rolled-in unflatness and other types of unflatness, it is preferred to provide means to invert the sheet and measure the profile thereof in the inverted position. If a singular sheet is being measured, the same sensing elements may be utilized. However, if a continuous length of the sheet is to be measured, a duplicate sensing system must be provided for the second profile determination. In both cases, however, additional circuitry is necessary to determine and display the average and deviation of the average profiles from the transverse profile such as is shown in FIGS. 7C and 7D.

Figure 7A:
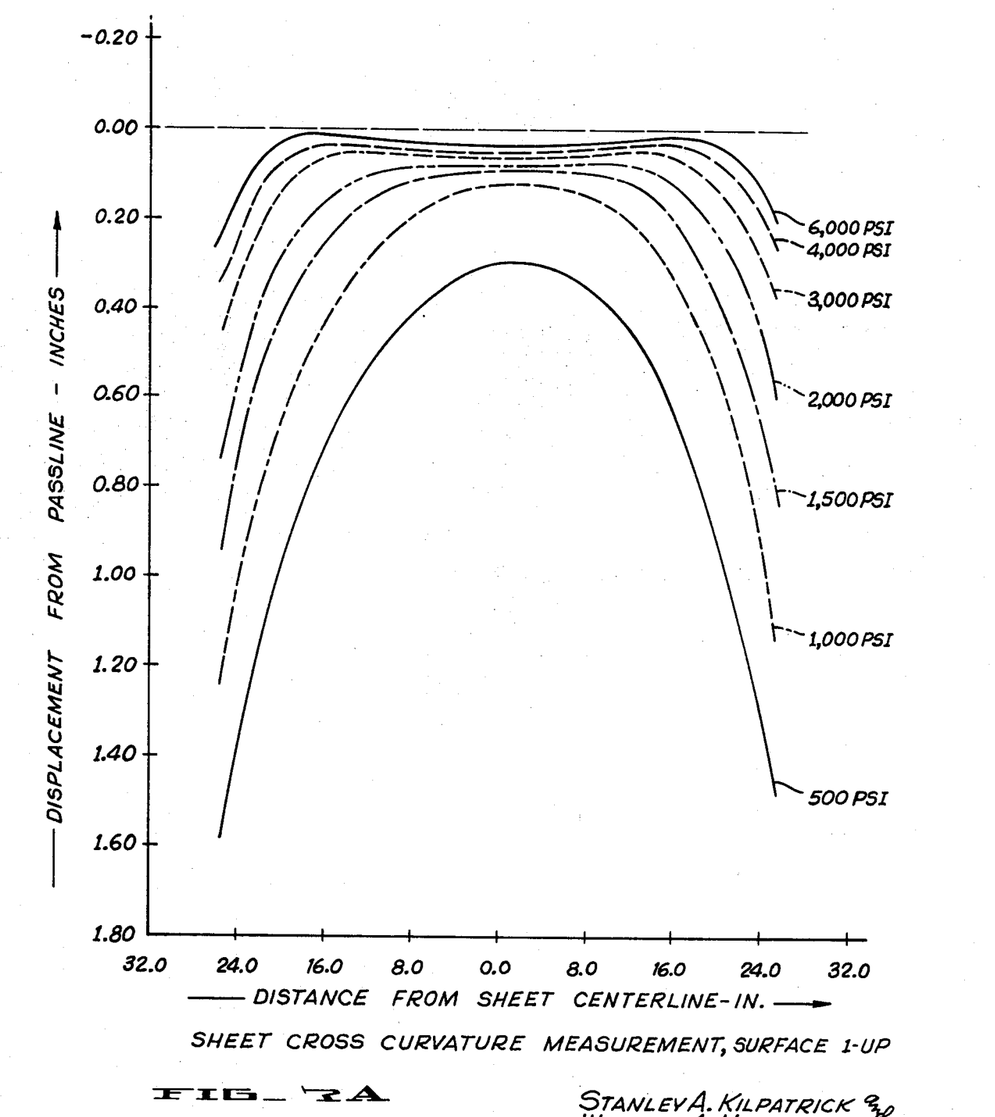
FIGS. 7A and 7B are actual transverse profiles of a sheet measured at various levels of tension.
Figure 7B:
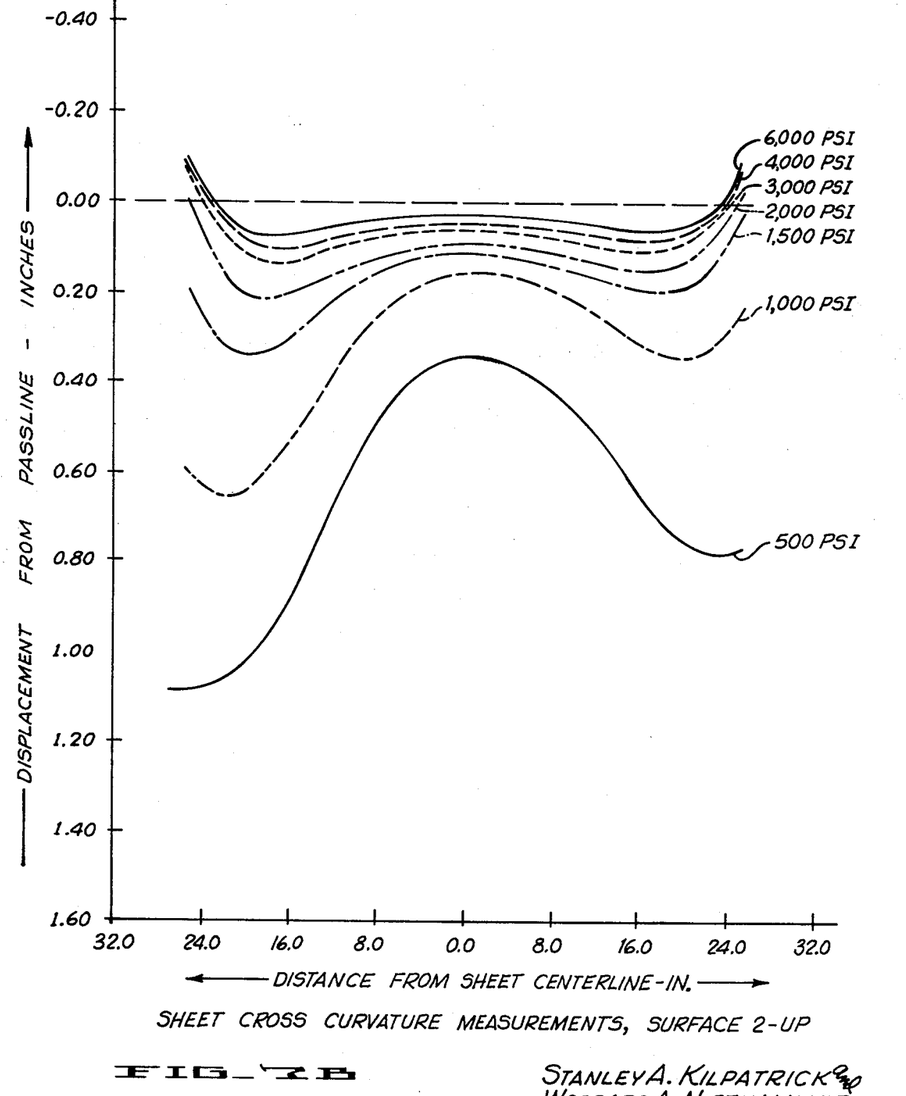
Figure 7C:
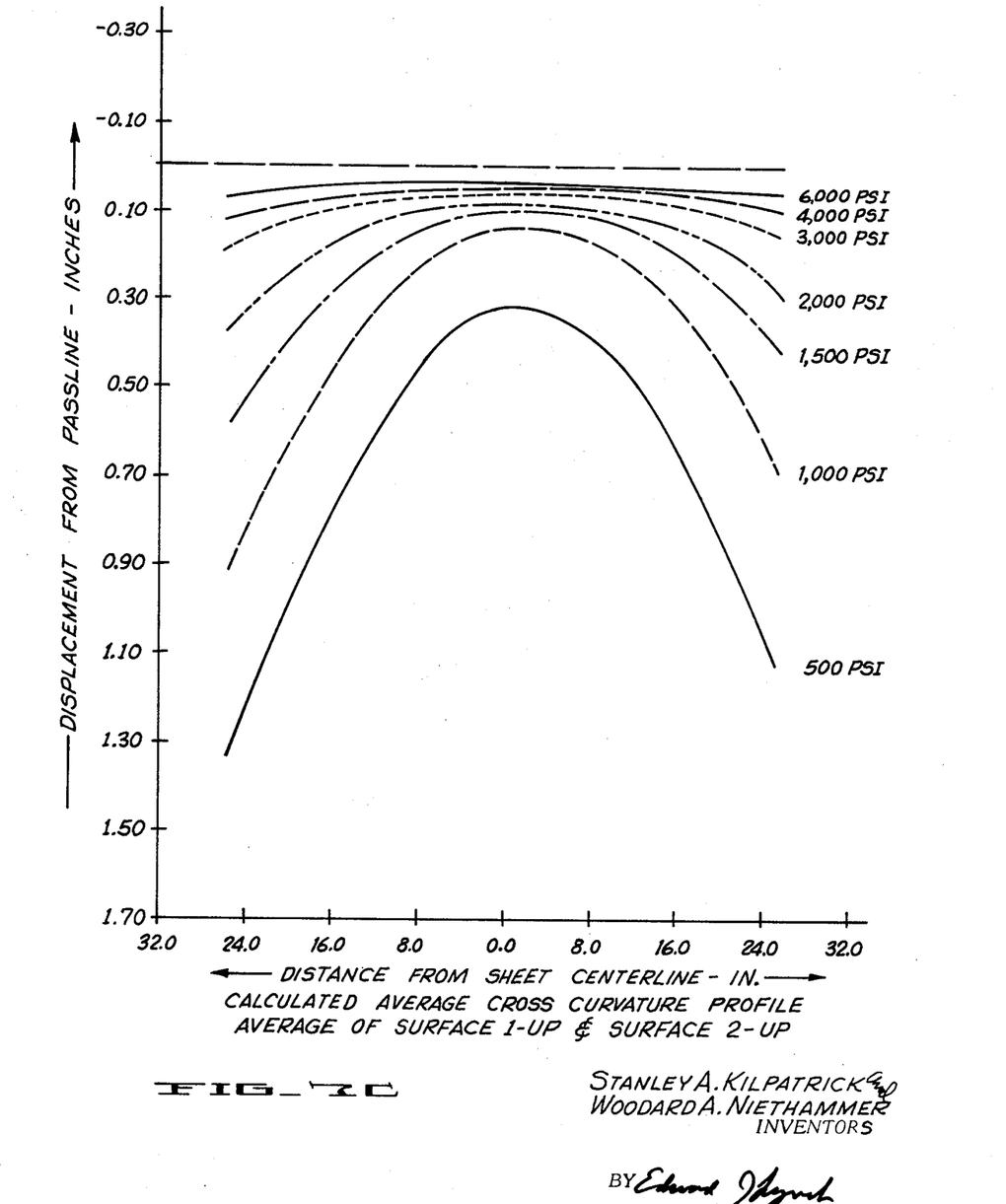
FIG. 7C is the average of the profiles of the two surfaces shown in FIGS. 7A and 7B.

FIGS. 7A and 7B represent actual cross curvatures of sheet material measured in accordance with this invention. The sheet was a 3004–H14 aluminum alloy sheet having a thickness of 0.24 inches and a width of 51 inches. The test span length was 12 feet 4 inches. Tension was placed in the sheet at levels of 500, 1,000, 1,500, 2,000, 3,000, 4,000 and 6,000 psi stress and the cross curvature of one surface of the sheet (side 1 up) was measured at each level of stress by the eddy current proximity sensor devices described above. The same procedure was repeated with the sheet inverted (side 2 up). The average of the profiles shown in FIGS. 7A and 7B is given in FIG. 7C which generally indicates the rolled-in unflatness. The deviation of the profile of side 1 from the average profile is shown in FIG. 7D, and this deviation generally indicates magnitude of the permanent set types of unflatness.

Figure 8:
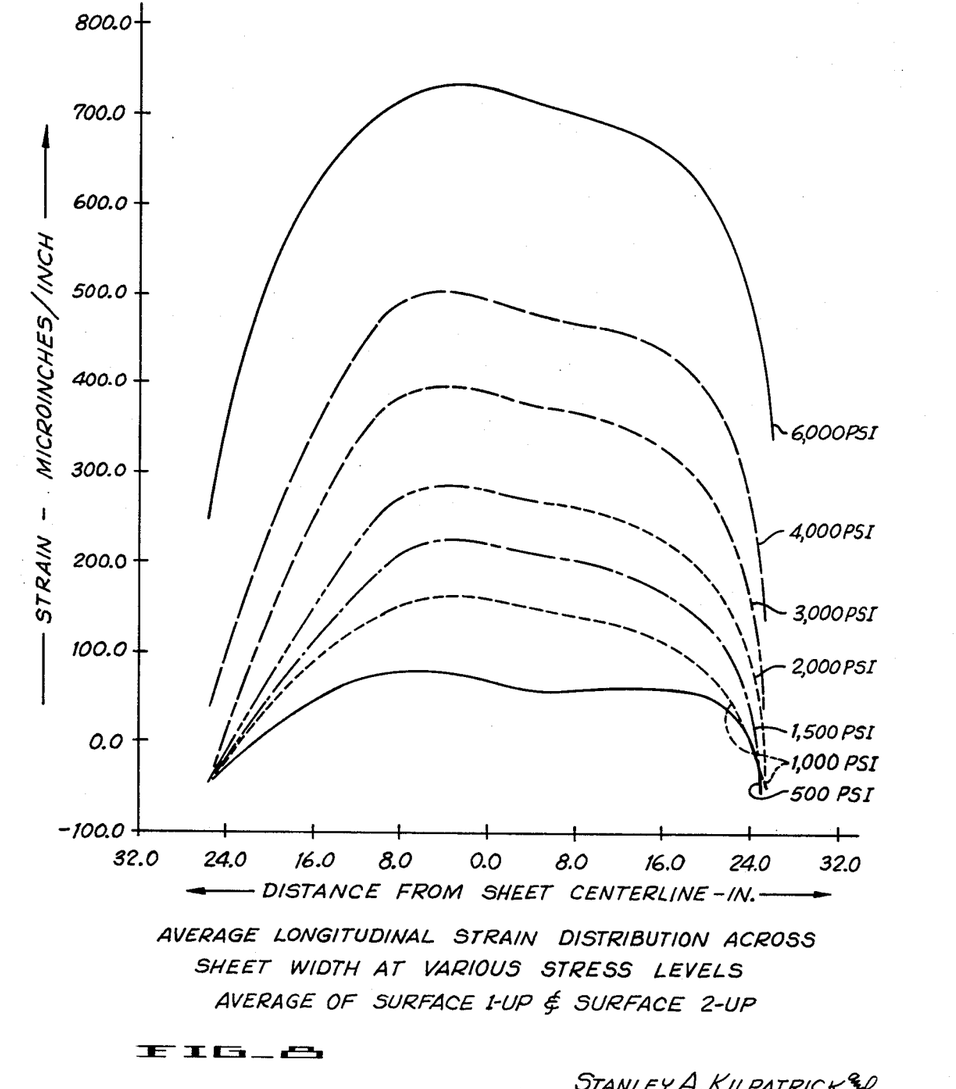
FIG. 8 is the average strain distribution measured by strain gauges mounted on the same sheet and recorded at various levels of tension.

A plurality of strain gages were placed transversely on both sides of the same sheet and the sheet was again subjected to tension at the same levels as above with side 1 and side 2 up. The average strain profile obtained is shown in FIG. 8. Using Equation 6, the maximum differential strain at the 4,000 psi level of applied stress was calculated from the average profile measurement shown in FIG. 7C to be $315 \times 10^{-6}$ in/in. From FIG. 8 the measured maximum differential strain was $400 \times 10^{-6}$ in/in. at the same 4,000 psi stress level.

Although the above description of the present invention has been primarily directed toward a noncontacting means for measuring sheet flatness by determining the transverse profile of the sheet, one aspect of the present inventive method can be employed with the prior art tension measuring systems such as those shown in U.S. Pat. Nos. 3,315,506; 3,442,104; 3,475,935, and 3,334,588. This aspect is the determination of an average and a deviation from the average by taking measurements on both sides of the sheet. The modification of the prior art would comprise measuring the tension at various points across the width of the tensioned sheet in a horizontal plane by suitable tension sensing devices such as magnetic means or pressure sensing means adjacent one surface of the sheet, inverting the sheet, subjecting the sheet to approximately the same tension as applied in the previous step, and again determining the tension at various points across the width of the sheet by suitable tension sensing devices adjacent to the other surface of the sheet.

By averaging the signals generated in the first tension determination with the signals generated in the second tension determination, the average tension profile so developed generally indicates the rolled-in differential strain. By subtracting the average tension profiles from one of the first or second tension profiles, a deviation from the average profile is developed which indicates the permanent bend set unflatness.

What is claimed is:

1. A method for determining the flatness of sheet material comprising:

A. Subjecting at least a portion of said sheet material to longitudinal tension which is at least sufficient to remove substantially all internal compressive strains in the longitudinal direction but less than the yield strength of the material and to a substantially uniform force per unit area substantially normal to a surface of said portion, whereby said portion assumes a double-curvature shape which is characteristic of the internal strains of said portion in an untensioned condition;
   B. sensing the distance from a datum plane spacially disposed from a first surface of said portion to a plurality of pints on said first surface transverse to the longitudinal direction by noncontacting means without changing the double-curvature shape; and
   C. generating a plurality of signals which are related to the distance sensed in order to determine the transverse profile of the said surface.

2. The method of claim 1 comprising the additional steps of:

A. Subjecting said portion to approximately the same tension and the same uniform force per unit area in the opposite direction of said first uniform force per unit area substantially normal to a second surface of said portion as in step A of claim 1, whereby said portion assumes a double-curvature shape which is characteristic of the internal strains of said portion in an untensioned condition;
   B. sensing the distance from a datum plane spacially disposed from said second surface to a plurality of points on said second surface transverse to the longitudinal direction by noncontacting means without changing the double-curvature shape; and
   C. generating a second plurality of signals which are related to the distance sensed to determine a transverse profile of said second surface.

3. The method of claim 2 wherein the first plurality of signals is averaged with the second plurality of signals to produce a plurality of signals representing an average profile which indicates the rolled-in differential strain in said sheet material in an untensioned condition.

4. The method of claim 3 wherein the difference between one of the first and second plurality of signals and the plurality of signals representing the average profile is obtained to determine a deviation profile which indicates the permanent bend set caused by transverse and longitudinal bending strain.

5. The method of claim 1 wherein the tensioned portion of said sheet material is maintained in a horizontal position.

6. The method of claim 2 wherein the tensioned portion of said sheet material is maintained in a horizontal position during said second sensing.

7. The method of claim 1 wherein said profile is reproduced on a display device.

8. The method of claim 2 wherein said second profile is reproduced on a display device.

9. The method of claim 3 wherein said average profile is reproduced on a display device.

10. The method of claim 4 wherein the deviation from the average profile is reproduced on a display device.

11. The method of claim 1 wherein the tension is less than 50 percent of the yield strength of the material.

12. The method of claim 2 wherein the tension is less than 50 percent of the yield strength of the material.

13. The method for determining the rolled-in differential strain in sheet material comprising:
   A. Subjecting at least a portion of said sheet material in a horizontal plane to longitudinal tension which is at least sufficient to remove substantially all internal strains in the longitudinal direction, but less than the yield strength of the material, whereby said portion assumes a double-curvature shape which is characteristic of internal strains of said portion in an untensioned condition;
   B. sensing the distance from the pass line of the tension applying means to at least three points on a first surface of said portion transverse to the longitudinal direction by noncontacting proximity sensing means without changing said double-curvature shape;
   C. generating a plurality of signals which are related to the distances sensed in order to determine the transverse profile of said surface; and
   D. utilizing said signals in determining the rolled-in differential strain, $\epsilon_0$, by computing means from the equation $$\epsilon_0 = (\gamma L^2/16E)\,[(2/d_c) - (1/d_a) - (1/d_b)].$$

14. The method for determining the rolled-in differential strain in sheet material comprising:
   A. Subjecting at least a portion of said sheet material in a horizontal plane to longitudinal tension which is at least sufficient to remove substantially all internal strains in the longitudinal direction, but less than the yield strength of the material whereby said portion assumes a double-curvature shape which is characteristic of the internal strains of said portion in an untensioned condition;
   B. sensing the distance from the pass line of the tension applying means to at least three points on a first surface of said portion transverse to the longitudinal direction by noncontacting proximity sensing means without changing said double-curvature shape;
   C. generating a first plurality of signals which are related to the distances sensed in order to determine the transverse profile of said portion;
   D. inverting said portion of the sheet material;
   E. subjecting said portion to approximately the same tension as in step A above whereby said portion assumes a double-curvature shape which is characteristic of the internal strains in said portion in an untensioned condition;
   F. sensing the distance from the pass line of the tension applying means to at least three points on said surface of said portion transverse to the longitudinal direction by noncontacting proximity sensing means;
   G. generating a second plurality of signals which are related to the distances sensed in order to determine transverse profile of said portion;
   H. averaging the first and second plurality of signals to produce a plurality of signals representing an average profile which is characteristic of the rolled-in differential strains in said sheet in an untensioned condition; and
   I. utilizing said signals representing the average profile in determining the rolled-in differential strain, $\epsilon_0$, by computing means from the equation $$\epsilon_0 = (\gamma L^2/16E)\,[(2/d_c) - (1/d_a) - (1/d_b)].$$

15. In the process of measuring sheet flatness wherein the sheet material is placed in tension and the tension across the width of said sheet material transverse to longitudinal direction is sensed at a plurality of points by tension sensing means, the improvement comprising sensing the tension across the width of the sheet material at a plurality of points by tension sensing means adjacent one surface of said sheet material, generating a first plurality of signals which are related to tension measured to determine a first tension profile, sensing the tension across the width of the sheet material at a plurality of points by tension sensing means adjacent the other surface of said sheet material, generating a second plurality of signals which are related to the tension measured to determine a second tension profile, averaging the first and second plurality of signals to provide a plurality of signals representing an average tension profile which indicates the rolled-in differential strain in said sheet material in the untensioned condition, the tension and forces substantially normal to the surface in the first and second tension determinations being substantially equivalent.

16. The process of claim 15 wherein the difference between one of the first and second plurality of signals and the signals representing the average tension profile is obtained to determine a deviation from the average tension profile which indicates the permanent bend set caused by transverse and longitudinal bending strains.

17. A system for determining sheet flatness comprising;
   A. means to apply sufficient tension to a sheet to remove substantially all internal compressive strains therein, whereby said sheet assumes a double-curvature shape which is characteristic of the internal strains of said sheet in an untensioned condition;
   B. a plurality of noncontacting proximity sensing means in a datum plane adjacent to and spacially disposed from a surface of said sheet in its tensioned state; and
   C. means associated with each of said proximity sensing means to generate a signal which is related to the distance from the datum plane to the surface of the sheet.

18. The system of claim 17, including:
   A. A second means to apply sufficient tension to said sheet to remove substantially all internal compressive strains therein;
   B. a second plurality of noncontacting proximity sensing means in a second datum plane adjacent to and spacially disposed from the other surface of said sheet; and
   C. means associated with each of said second proximity sensing means to generate a second signal which is related to the second distance from the second datum plane to the other surface.

19. The system of claim 18, including means to average said first and second signals whereby an average profile of said sheet is developed.

20. The system of claim 17, including means to display said first signals as a first transverse profile of said sheet.

21. The system of claim 18, including means to display said second plurality of signals as a second transverse profile of said sheet.

22. The system of claim 19, including means to obtain a difference between one of the first or second plurality of signals and the signals representing the average profile, whereby a deviation profile is developed.

23. The system of claim 19, including means to display the average profile.

24. The system of claim 23, including means to display the deviation profile.

* * * * *